(12) United States Patent
Ku et al.

(10) Patent No.: US 7,225,980 B2
(45) Date of Patent: Jun. 5, 2007

(54) SHOPPING CART WITH RFID CAPABILITY

(75) Inventors: Chun-Hui Ku, Taipei (TW); Chun-Te Yu, Yunlin County (TW); Wei Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 39 days.

(21) Appl. No.: 11/149,256

(22) Filed: Jun. 10, 2005

(65) Prior Publication Data
US 2006/0208072 A1 Sep. 21, 2006

(30) Foreign Application Priority Data
Mar. 15, 2005 (TW) .............................. 94107808 A

(51) Int. Cl.
*G06K 15/00* (2006.01)
(52) U.S. Cl. .................. 235/383; 235/451; 235/472.01
(58) Field of Classification Search ................ 235/383, 235/385, 435, 451, 472.01; 340/568.5
See application file for complete search history.

(56) References Cited

U.S. PATENT DOCUMENTS

| | | | | |
|---|---|---|---|---|
| 3,994,505 A | * | 11/1976 | Balha ..................... | 280/33.994 |
| 5,072,956 A | * | 12/1991 | Tannehill et al. ...... | 280/33.992 |
| 5,457,447 A | | 10/1995 | Ghaem et al. ......... | 340/825.54 |
| 5,729,697 A | | 3/1998 | Schkolnick et al. ........ | 395/223 |
| 5,841,067 A | * | 11/1998 | Nakamura et al. .......... | 174/382 |
| 6,179,206 B1 | | 1/2001 | Matsumori ................... | 235/383 |
| 6,659,344 B2 | | 12/2003 | Otto et al. .................. | 235/381 |
| 6,766,931 B2 | * | 7/2004 | Wolf .......................... | 224/411 |
| 6,997,382 B1 | * | 2/2006 | Bhri ........................... | 235/383 |
| 2004/0065732 A1 | * | 4/2004 | Bernds et al. .............. | 235/383 |
| 2004/0252025 A1 | * | 12/2004 | Silverbrook et al. ..... | 340/568.5 |

* cited by examiner

*Primary Examiner*—Thien M. Le
*Assistant Examiner*—Edwyn Labaze
(74) *Attorney, Agent, or Firm*—Troxell Law Office, PLLC

(57) ABSTRACT

The present invention discloses a shopping cart with RFID capability, for detecting a RFID tag, comprising: a frame, further comprising: an accommodating space for accommodating RFID-tagged items; a plurality of wheels, coupling to the frame for carrying the frame to move according to the rotation of the wheels; and a cover, rotatably mounted on the frame for sealing the accommodating space; a reader unit, further comprising: a RFID reader, attached to the frame; and at least an antenna, electrically connected to the RFID reader and being received in the accommodating space of the frame; a memory unit, attached to the frame and being electrically connected to the RFID reader; a control unit, further comprising: an actuating device, coupled to the frame and the cover in respective and capable of open/close the cover while operating; a sensing device, attached to the frame and being electrically connected to the RFID reader, capable of activating the RFID reader to start/stop reader RFID tags through the antenna with respect to the sensing unit sensing the opening/closing of the cover; and a power unit, for providing power to the reader unit, the memory unit and the control unit.

11 Claims, 3 Drawing Sheets

SHOPPING CART WITH RFID CAPABILITY

1. FIELD OF THE INVENTION

The present invention relates to a shopping cart with Radio Frequency Identification (RFID) capability, and more particularly, to a shopping cart with RFID capability having covers pivotally connected thereto for shielding the electromagnetic wave from a user while it is closed.

2. BACKGROUND OF THE INVENTION

It is common for a consumer to use shopping carts instead of hand-held basket while doing his/her-shopping in a wholesale store or a supermarket, not only because it is convenient and labor-saving, but also because it can carry more items than that of the basket in one shopping trip. Recently, along with the advance of RFID technology, the idea of attaching RFID devices to a shopping cart for facilitating the operations at the checkout counter has been proposed, and such usage of RFID technology can be found in the relating patents list as following: R,O,C, Pat. No. 588267, U.S. Pat. No. 6,179,206, U.S. Pat. No. 6,659,344, and U.S. Pat. No. 5,729,697.

Nevertheless, the PFID devices referred in the abovementioned patents are emitting radio frequency (RF) constantly for scanning inside the shopping cart and the surrounding thereof all the way with a shopper during shopping. That is, the REID devices of prior art only focus on the usages and the applications thereof, and without concerning the influence of electromagnetic wave generated thereby to human body, also without considering the power source for powering the RFID devices. In fact, it is noted that the scanning range of a RFID device is not limited inside the shopping cart where it is attached to, but can interrogate the RFID-tagged objects inside other nearby shopping carts or on the shelves as is revealed in the U.S. Pat. No. 6,659,344, moreover, there may be corners inside the shopping cart that is blind to the RFID device, which may be caused by the placing and stacking of RFIG-tagged objects in the shopping cart, as is revealed in the U.S. Pat. No. 5,729,697.

An RF electromagnetic wave or RF "field" has both an electric and a magnetic component (electric field and magnetic field), and it is often convenient to express the intensity of the RF environment at a given location in terms of units specific for each component. For example, the unit "volts per meter" (V/m) is used to measure the strength of the electric field (electric "field strength"), and the unit "amperes per meter" (A/m) is used to express the strength of the magnetic field (magnetic "field strength"). Another commonly used unit for characterizing an RF electromagnetic field is "power density." Power density is defined as power per unit area. For example, power density can be expressed in terms of milliwatts per square centimeter ($mW/cm^2$) or microwatts per square centimeter ($\mu W/cm^2$). With respect to frequencies in the microwave range and higher, power density is usually used to express intensity. According, as specified in the FCC safety guidelines for the 800~900 MHz range, the safe RF level is 1000 $\mu W/cm^2$. Moreover, the safety regulation specified by the Directorate General of Telecommunications of Minister of Transportations and Communications of R.O.C is listed in the table hereafter.

| Frequency Range (MHz) | Electric Field Strength (V/m) | Magnetic Field Strength (A/m) | Power Density ($mW/cm^2$) | Duartion (minutes) |
|---|---|---|---|---|
| 0.3–3.0 | 614 | 1.63 | *100 | 30 |
| 3–30 | 1842/f | 4.89/f | *180/f2 | 30 |
| 30–300 | 27.5 | 0.073 | 1.0 | 30 |
| 300–1,500 | — | — | f/1500 | 30 |
| 15,000–100,000 | — | — | 1.0 | 30 |

*represents the equivalent plane wave power density

Imaging that as every shopping carts in a store is equipped with a device constantly radiating RF signal, each shopper in the store is conceived to receive overdosed electromagnetic wave easily, which is unhealthy and is also true for the sale persons in the store as well Moreover, since the RFID device attached on a shopping cart will consume power, it is required to send the shopping cart to a maintenance location for charging such that the store will have to prepare a lot more shopping carts and a larger space for storing the same. Further, it is possible for a RFID device of a shopping cart to run out of power while the shopping cart is being used by a shopper, in that might cause some trouble for both the shopper and the store. It is also a consideration that the all-time-power-on RFID device is a waste of energy and is not a good idea for environmental conservation.

SUMMARY OF THE INVENTION

The primary object of the invention is to provide a shopping cart with RFID capability, which can produce a RF field within the shopping cart for detecting RFID tags attached on goods of a store, and the shopping cart is equipped with a cover that can be closed for blocking electromagnetic waves and thus preventing a user to be hurt by the same.

It is another object of the invention to provide a shopping cart with RFID capability, which is equipped with a small-scale power unit capable of generating electricity by the movement of the shopping cart.

To achieve the above objects, the present invention provides a shopping cart with RFID capability, for detecting a RFID tag, comprising:
  a frame, made of a material capable of blocking electromagnetic waves like metal plate, further comprising: an accommodating space for accommodating RFID-tagged items; a plurality of wheels, coupling to the frame for carrying the frame to move accordingly; and a cover, rotatably mounted on the frame for sealing the accommodating space;
  a reader unit, comprising: a RFID reader, attached to the frame; and an antenna, electrically connected to the RFID reader and being received in the accommodating space of the frame and connecting to the frame and the cover;
  a memory unit, attached to the frame and being electrically connected to the RFID reader, preferably is a device selected from the group consisting of a hard disk, a soft disk, an optical disc, a RFID tag, a flash disk and a grouping of PenDrive;
  a control unit, further comprising: an actuating device, coupled to the frame and the cover in respective and capable of open/close the cover while operating; a sensing device, attached to the frame and being electrically connected to the RFID reader, capable of activating the RFID reader to start/stop reader RFID tags through the antenna with respect to the sensing unit sensing the opening/closing of the cover; and a power unit, preferably being a battery pack with rechargeable batteries, for providing power to the reader unit, the memory unit and the control unit.

In a preferred embodiment of the invention, the shopping cart with RFID capability further comprises a display, attached to the frame and being electrically connected to the memory unit and the power unit, which is used for display information of the memory unit. In addition, the display is a device selected from the group consisting of a Cathode Ray Tube (CRT), a light emitting device (LED), Liquid Crystal Display (LCD) and a grouping of computers.

In another embodiment on the invention, the shopping cart with RFID capability further comprises a power generating unit, attached to the frame and being electrically connected to the power unit, which can be a device capable of generating power by function, that by contacting to at least one of the plural wheels, so the power generating unit can generate power with respect to the rotating of the wheel, or the power generating unit can be a radio frequency device that can receive electromagnetic waves and then transfer the same into power.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

Figure 1:
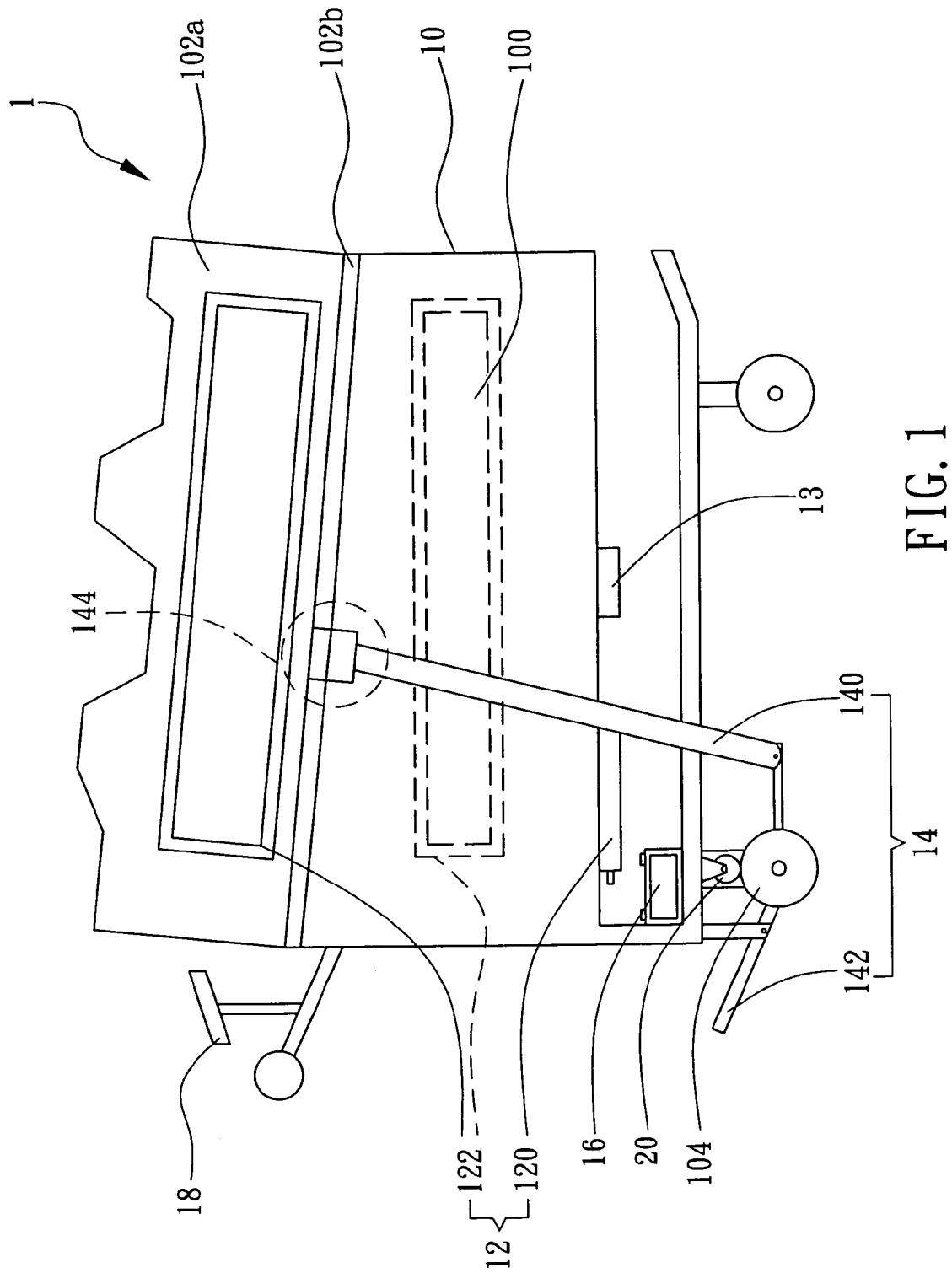
FIG. 1 is a side view of a shopping cart with RFID capability according to the present invention.
Figure 2:
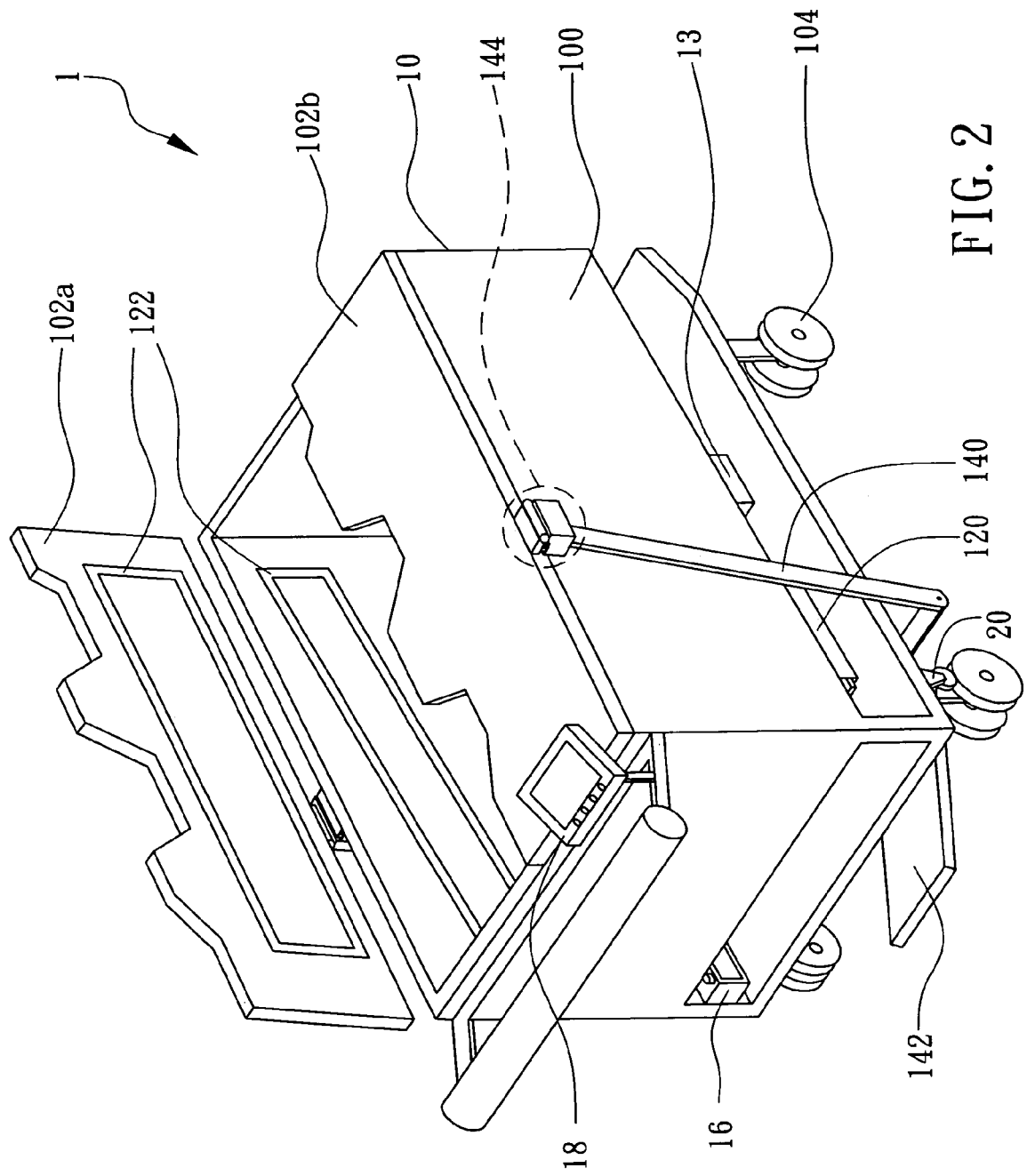
FIG. 2 is a 3D view of a shopping cart with RFID capability according to the present invention.

Please refer to FIG. 1 and FIG. 7 which are respectively a side view and a 3d view of a shopping cart with RFID capability 1 according to the present invention. The shopping cart 1 of the invention comprises a frame 10, a reader unit 12, a memory unit 13, a control unit 14 and a power unit 16.

The frame 10 has an accommodating space 100 for accommodating RFID-ragged items. Further, the frame 10 has a plurality of wheels 104, coupling to the frame for carrying the frame 0 to move according to the rotation of the wheels 104; and two covers 102a and 102b, rotatably mounted on the frame 10 respectively by a pivot 144 for sealing the accommodating space 100, where in FIG. 1 that the cover 102a is open and the cover 102b is closed.

The reader unit 12 comprise a RFID reader 120 and an antenna 122, where the RFID reader 120 is attached to the frame 11, and the antenna 122 is electrically connected to the RFID reader 122 and is received in the accommodating space 100 as shown by the dash line of FIG. 1 while connecting to the covers 101a and 102b.

The memory unit 13 is attached to the frame and is electrically connected to the RFID reader 120 that is used for recording the shopping information of users. The Control unit 14 comprises an actuating device 140, a pedal 142 and a sensing device, where the actuating device is coupled to the pivot 144 and the frame 10 in respective such that a user can use the pedal 142 to actuate the pivot 144 for enabling the covers 102a, 102b to open or close.

In a preferred embodiment of the invention the shopping cart with RFID capability 1 further comprises a display 18, attached to the frame 10 and being electrically connected to the memory unit 13, which is used for display information of the memory unit 13. The power unit 16 is connected to the reader unit 12, the memory unit 13m the control unit 14 and the display 18 for providing power to t reader unit 12, the memory unit 13m the control unit 14 and the display 18.

The shopping cart 1 of the invention further comprises a power generating unit 20, which is attached to the frame 10 and is electrically connected to the power unit 16. In FIG. 1, the power venerating unlit is a device 20 capable of generating power by friction, that by contacting to at least one of the plural wheels 104, so the power generating unit 20 can generate power with respect to the rotating of the wheel 104 as the cart 1 is pushed to move, and then the power generated by the power generating unit 20 is transferred to the power unit 16 for charging the same.

Figure 3:
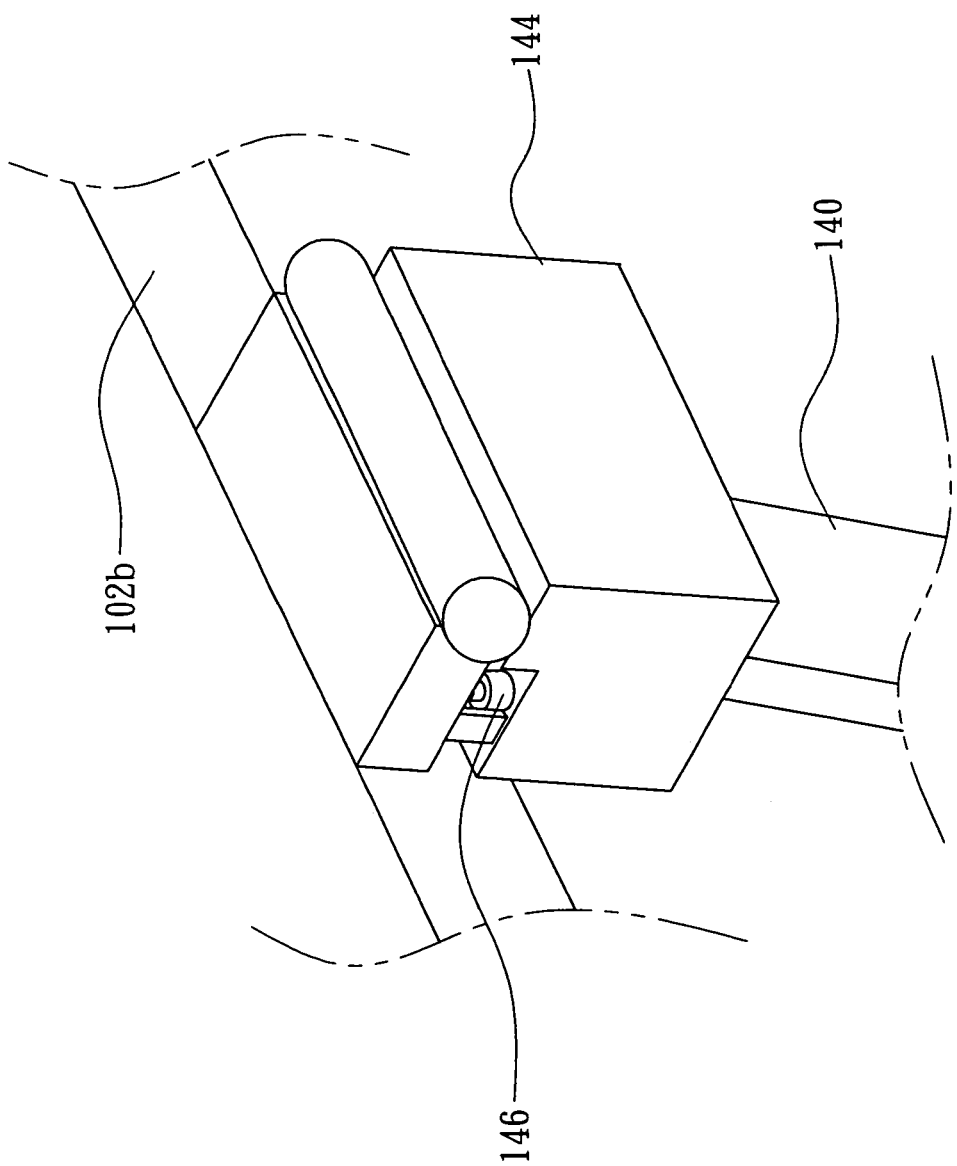
FIG. 3 a partial enlarged view of a shopping cart with RFID capability according to the present invention.

Please refer to FIG. 3, which is a partial enlarged view of a shopping cart with RFID capability according to the present invention. As seen in FIG. 3, a sensing switch 146 is arranged above the pivot 144, which is connected to the pivot 144 and is electrically connected to the RFID reader 120 such that as the opening or closing of the cover 102a will activate the sensing switch 146, the sensing switch 146 will enable the RFID reader 120 to start or stop the electromagnetic wave emission through the antenna 122 for scanning RFID tags. That is, the scanning is activated as the cover is open and the scanning is stopped as the cover is closed, or vice versa. In a preferred embodiment, the scanning can be programmed to last for a specific period of time like 3~5 seconds and automatically stopped as each opening and closing of the cover so as to ensure the RFID tags detected by the RFID reader 120 are those being attached on the items within the shopping cart 1. Other means of reading can be programmed with respect to individual needs of a user or a wholesale store which is not describe further hereinafter.

Although the sensing switch 146 shown in FIG. 3 is a button switch, other kind of switch can be used as the sensing switch 146, only if it can sense the movement of the cover so as to activate the RFID reader for starting or stopping the scanning.

Moreover, the display is a device selected from the group consisting of a Cathode Ray Tube (CRT), a light emitting device (LED), Liquid Crystal Display (LCD) and a grouping of computers, and the memory unit is a device selected from the group consisting of a hard disk, a soft disk, an optical disc, a RFID tag, a flash disk and a grouping of PenDrive. In addition to the device capable of generating power by friction, the power generating device can be a radio frequency device, capable of receiving electromagnetic waves and then transferring the same into power. Therefore, by place RF transmission devices at specific positions in the store, the shopping cart can receive the electromagnetic waves generated therefrom so as to generate power. In a preferred embodiment of the invention, the power unit is a rechargeable battery which can be charged by plugging the same to a common plug. Further, the frame is preferred to be made of metal so is to block the electromagnetic waves effectively and thus prevent a user and the surrounding to be hurt by the same. It is noted that although the memory unit, the power unit, the power generating unit and the RFID reader are (disposed separately according to the embodiment of the invention ail these units can be integrated into an unit for maximizing the space utilization of the shopping cart.

From the above description, it is noted that the present invention not only can prevent the human body to be hurt by diffused electromagnetic wave, but also can generating power for charging itself while being used, such that the shopping cart is a product capable of competing with other products in the filed.

While the preferred embodiment of the invention has been set forth for the purpose of disclosure, modifications of the disclosed embodiment of the invention as well as other embodiments thereof may occur to those skilled in the art. Accordingly the appended claims are intended to cover all embodiments which do not depart from the spirit and scope of the invention.

What is claimed is:

1. A shopping cart with RFID capability for detecting a RFID tag located on RFID-tagged items, the shopping cart comprising:
   a) a frame having:
      i) an accommodating space having an opening on a top thereof and accommodating the RFID-tagged items;
      ii) a plurality of wheels rotatably connected to a bottom of the frame for supporting the frame and selectively facilitating a movement of the frame by a rotation of the plurality of wheels; and
      iii) a cover pivotally connected to the frame and selectively sealing the opening of the accommodating space, the cover is movable between open and closed positions;
   b) a reader unit having:
      i) a RFID reader connected to the frame; and
      ii) at least one antenna electrically connected to the RFID reader and located in the accommodating space of the frame;
   c) a memory unit connected to the frame and electrically connected to the RFID reader;
   d) a control unit having:
      i) an actuating device connected to the frame and the cover and selectively moving the cover between the open and closed positions; and
      ii) a sensing device connected to the frame and electrically connected to the RFID reader, the sensing device controlling the RFID reader through the at least one antenna, the sensing device turning the RFID reader on when the cover is located in the open position and turning the RFID reader off when the cover is located in the closed position; and
   e) a power unit providing power to the reader unit, the memory unit and the control unit.

2. The shopping cart of claim 1, wherein the frame is made of a made of a material capable of blocking electromagnetic waves.

3. The shopping cart of claim 2, wherein the material is metal.

4. The shopping cart of claim 1, wherein the antenna is arranged at a position selected from the inner walls of the frame and the cover.

5. The shopping cart of claim 1, further comprising a display attached to the frame and being electrically connected to the memory unit, the display displaying information of the memory unit.

6. The shopping cart of claim 5, wherein the display is a device selected from the group consisting of a Cathode Ray Tube (CRT), a light emitting device (LED), Liquid Crystal Display (LCD) and a grouping of computers.

7. The shopping cart of claim 1, wherein the power unit is a device selected from the group consisting of a power generating unit attaching to the frame and a battery pack.

8. The shopping cart of claim 7, wherein the battery pack has a plurality of rechargeable batteries.

9. The shopping cart of claim 7, wherein the power generating unit is a device capable of generating power by friction by contacting at least one of the plurality of wheels, the power generating unit generating power with respect to the rotating of the wheel.

10. The shopping cart of claim 7, wherein the power generating unit is a radio frequency device capable of receiving electromagnetic waves and then transferring the electromagnetic waves into power.

11. The shopping cart of claim 1, wherein the memory unit is a device selected from the group consisting of a hard disk, a soft disk, an optical disc, a RFID tag, a flash disk and a grouping of PenDrive.

* * * * *